Figure 1:
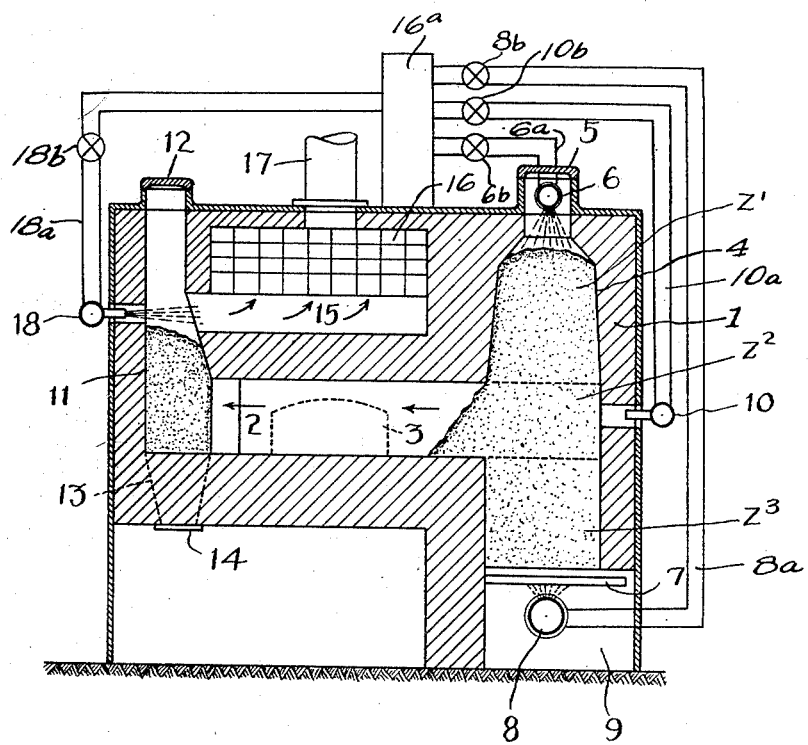

May 6, 1930.                R. WARSITZ                 1,757,492
                          INDUSTRIAL FURNACE
                   Filed July 3, 1928        2 Sheets-Sheet 1

Robert Warsitz
INVENTOR

BY  W. J. Bissing
ATTORNEY

May 6, 1930.  R. WARSITZ  1,757,492
INDUSTRIAL FURNACE
Filed July 3, 1928  2 Sheets-Sheet 2

Robert Warsitz
INVENTOR

BY W. F. Bissing.
ATTORNEY

Patented May 6, 1930

1,757,492

UNITED STATES PATENT OFFICE

ROBERT WARSITZ, OF HATTINGEN-RUHR, GERMANY

INDUSTRIAL FURNACE

Application filed July 3, 1928, Serial No. 290,207, and in Germany June 15, 1927.

The invention relates to industrial furnaces for example reverberatory furnaces and the like, such as melting, tempering, reheating furnaces, continuous, pushing, and open-hearth furnaces, in which a flame is produced by the combustion of a mixture of a heating gas and air. The invention has for its object to provide a furnace construction which permits in a very simple manner a regulation of the temperature of the furnace and of the nature of the flame, that means to produce an oxidizing, neutral, or reducing flame, and also to permit the waste heat to be utilized to a large extent. The invention substantially consists in the fact, that the gas-air mixture to be burnt is led, before entering the flame chamber of the furnace, through a glowing layer of distilled solid fuel, which layer is located immediately before the flame chamber and the radiating heat of which is used by the flame chamber.

Industrial furnaces are already well-known, in which a mixture of gas and air is burnt within a layer of refractory material or within specially designed radiating bricks, to produce a so-called flameless surface combustion, the radiating heat of this refractory material being utilized to heat the furnace room through which pass only the waste gases. In comparison with these, the furnace construction according to the present invention affords the great advantage that a large portion of the heat required to heat the furnace is produced by the combustion of the distilled glowing solid fuel itself. Now, since the calories are much more expensive when produced by a gaseous fuel, than by a solid fuel, a considerable saving is thereby obtained with equal production of heat. Furthermore, by simply regulating the air supply, any desired nature of the flame may be obtained, that is, an oxidizing, neutral, or reducing one. Of course the combustion of the distilled solid fuel has to be effected in this regulation. A further advantage resides in the fact, that heat is also produced by the combustion of a solid fuel, so that a radiation of heat into the furnace room proper takes place immediately after the solid fuel becomes glowing, whilst with other furnaces the refractory material permanently consumes heat, up to its becoming red, but the material itself does not produce heat. Therefore the starting period of the furnace of the invention is more rapid.

An improvement of the invention further consists in providing means for leading the waste gases, leaving the flame chamber of the furnace, through a hot filling mass which may consist of a layer of refractory material or of distilled solid fuel, where they deliver a large portion of their sensible heat which is led back to the flame chamber by radiation. An extraordinarily uniform heating of the flame chamber is obtained in this manner, this being a great advantage particularly with tempering furnaces.

As known, the waste gases of every furnace contain a certain quantity of combustion water, that hitherto has not been utilized. By arranging in the preferred form a glowing layer of solid fuel immediately behind the flame chamber of the oven the vapor contained in the waste gases is split for the greatest part and water gas is formed. By supplying a corresponding quantity of combustion air this water gas may be burnt and the heat thus produced is likewise led back to the flame chamber by radiation. Of course, it will be possible without difficulty to further utilize the sensible heat of the waste gases, e. g. by providing preheaters, such as regenerators or recuperators serving to preheat the combustion air.

In order to allow of the invention to be more easily understood, three furnaces constructed in accordance with the invention are illustrated by way of example in the accompanying drawings.

Figure 2:
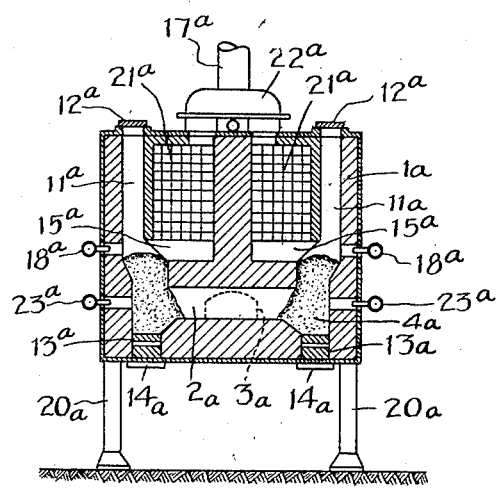
Figure 3:
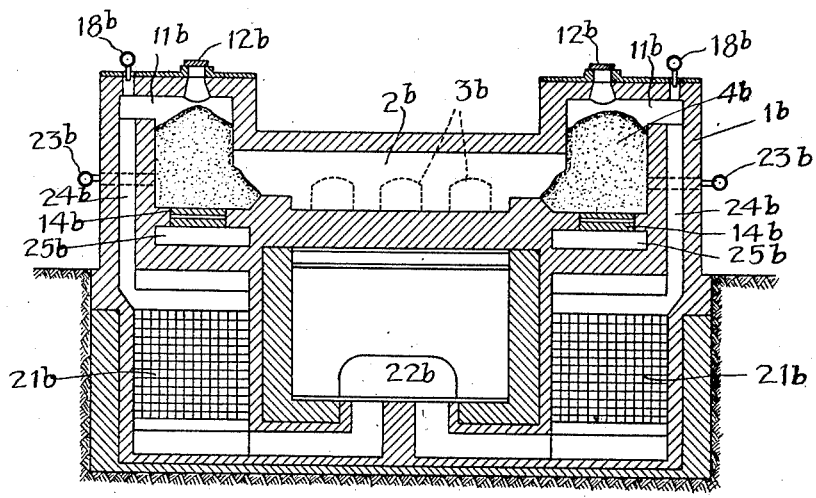

Figure 1 is a vertical cross section through the furnace forming the first embodiment, Figure 2 is a similar section through the furnace forming the second embodiment, and Figure 3 is the same section through the third furnace.

The embodiment shown in Figure 1 will be described first.

1 denotes the furnace body which in the usual manner consists of refractory brickwork and comprises a flame chamber 2, provided with a hearth, an aperture 3 that can be closed, and through which may be introduced the material or the pieces to be heated. On one side of the flame chamber is arranged a feeding shaft 4 with a cover 5 into which shaft solid fuel may be introduced from above. A pipe 6 further serves to supply combustion air from above to the shaft 4, advantageously under a determined pressure above atmospheric. At the lower end of shaft 4 is arranged a grate 7 and below the latter a conduit 8 likewise serving to supply combustion air. An ash pan 9 is provided below the grate 7, from which pan the ash may be removed in the usual manner. About at the level of the flame chamber 2 a conduit 10 opens into the shaft 4, through which conduit air may likewise be supplied to the shaft. As indicated in the drawing, the shaft 4 is permanently filled with solid fuel. On the other side of the flame chamber 2 is disposed a flue 11 serving to draw off the waste gases and having a removable cover 12. This flue is partly, or up to a determined level, filled with refractory material or distilled solid fuel. A passage 13 downwardly extending through the brickwork 1 of the furnace and having a cover 14 permits of this filling material to be withdrawn from flue 11. To the flue 11 is connected a horizontal flue 15 through which the waste gases pass from flue 11 into a preheater, such as the recuperator 16, and from the latter to the chimney 17. An air supply conduit 18 further opens into the flue 11, this conduit being advantageously arranged about at the same level as flue 15. If the flue 11 is not wholly filled with the filling mass, it will be suitable to fill it only to such an extent, that the conduit 18 and the flue 15 still are above the filling material, as shown in the drawing. The recuperator 16 is in communication with the individual air supply conduits 6, 8, 10, 18 as by means of pipe $16^a$ and connecting conduits $6^a$, $8^a$, $10^a$, $18^a$ having suitable throttling means $6^b$, $8^b$, $10^b$, $18^b$. Furthermore, regulatable quantities of liquid or gaseous fuel may be supplied instead of air to the conduits 5 and 8.

When the described furnace is in operation, three zones $Z_1$, $Z_2$, $Z_3$ arise in the shaft 4. The uppermost zone $Z_1$ serves to distill the fuel, if fuel containing volatile constituents is used, or otherwise for the mere preheating of the fuel. The gases produced arrive together with the air supplied through conduit 6 in the medium zone $Z_2$ that forms a white-hot layer and is able to deliver its radiating heat immediately to the flame chamber 2. If required secondary air supplied through conduit 10 serves to assist in the combustion of the fuel. The fuel that has not been burnt in zone $Z_2$ sinks down to the lowermost zone $Z_3$, where it is completely gasified on the grate 7 by the aid of the air supplied through conduit 8. The gases produced rise to zone $Z_2$ and pass through the latter to the flame chamber. In this manner the total quantity of gases produced by the distillation and gasification of the fuel are led together with the combustion air through the zone $Z_2$ formed by a white-hot layer of distilled fuel, directly to the flame chamber 2.

As already mentioned above, an oxidizing, neutral or reducing flame may be obtained by suitably determining the quantity of air supplied through the conduits 6, 8, 10, without thereby rendering incomplete the combustion of the fuel in the shaft 4. It will be of advantage to always supply through the conduit 8 only that quantity of air which will be sufficient to completely gasify the fuel in zone $Z_3$, the quantity of air theoretically required to this end approximately being the correct one in practice. To obtain an oxidizing flame, so much air is supplied through the conduits 6 and 10, that an excess of air is prevailing, and, inversely, to obtain a reducing flame, less air is supplied than required for the combustion in zone $Z_3$.

The waste gases leaving the flame chamber 2 flow through the flue 11 and heat the filling mass therein, which again delivers the greatest part of its radiating heat to the flame chamber 2. The water vapor contained in the waste gases, the so-called combustion water, is split off to a large extent due to its contact with the glowing coke in flue 11, and water gas is thus produced. This water gas is then burnt by the aid of the air supplied through conduit 18, and the heat thus produced is utilized in the recuperator 16 to preheat the combustion air.

The hearth furnace illustrated in Figure 2 is a regenerative furnace operating with alternate direction of the flame in the flame chamber $2^a$. In this construction that is particularly well suited for small melting, tempering and heating furnaces, the brickwork $1^a$ of the furnace is supported by standards $20^a$, so that the furnace is accessible from all sides and easily portable. As shown in the drawing, a feeding shaft $11^a$ with cover $12^a$ and lower aperture with cover $14^a$ is disposed on each side of the flame chamber $2^a$, the latter being provided with aperture $3^a$. Above the filling mass $4^a$ which consists of a distilled solid fuel, preferably pit coal coke, a channel $15^a$ extends from each shaft $11^a$, which channels communicate each with a regenerator $21^a$. Each of the two regenerators $21^a$ communicates through a regulatable conduit $22^a$ with the chimney $17^a$, a throw-over valve (not shown) being provided to connect each conduit 22 alternately with the chimney $17^a$ or with the atmosphere. Besides the conduit $18^a$ that open into each shaft $11^a$ above the filling mass, conduits $23^a$ are arranged about at the level of the flame chamber, that open directly into the filling mass of the shafts 11ª. Through the conduits 18ª and 23ª secondary air or liquid or gaseous fuel or a mixture thereof may be supplied.

This furnace operates as follows:

The combustion air enters from conduit 22ª the regenerator 21ª located on the right in Figure 2, where it is preheated. The air then flows through channel 15ª into the feeding shaft 11ª and enters the coke layer. Through conduit 23ª heating gas is supplied also to the coke layer, where it is burnt together with the air and heats the coke layer up to white-heat. The radiating heat of the white-hot layer is led in its greatest part to the flame chamber 2ª, as will be understood from the drawing. The waste gases pass through the likewise glowing layer located on the other side of the flame chamber 2ª and enter through the respective channel 15ª the left-hand regenerator 21ª and escape from there through conduit 22ª into the chimney 17ª. After a determined period of time the furnace is reversed, so that the air flow and therewith the direction of the flame in the flame chamber takes place in inverse direction, viz. from left to right. The conduit 23ª on the waste heat side is then cut off.

As in this construction too water gas is produced by the water vapor contained in the waste gases being split, a subsequent combustion of the water gas may be obtained on the waste heat side of the furnace by supplying air through conduit 18ª, whereby the waste heat regenerator 21ª is heated up to an accordingly higher degree.

The conduit 18ª located on the opposite side of the furnace either may be cut off or liquid or gaseous fuel may be supplied through it during this period of inverse combustion.

The third embodiment illustrated in Figure 3 substantially differs from that of Figure 2 by a modified construction of the regenerators 21ᵇ. In this embodiment that is suited for large furnaces, the regenerators are arranged below the flame chamber 2ᵇ and communicate with the shafts 11ᵇ through channels 24ᵇ that open into the shafts 11ᵇ at the upper end thereof. Ash pits 25ᵇ serve to remove the ash, any suitable conveying means (not shown) being arranged therein to this purpose.

The operation of this furnace resembles that of the second embodiment.

Having thus described the invention and its operation, it will be understood that changes may be made in carrying the invention into effect without departing from the principle thereof.

Claims:

1. A furnace of the class described comprising a shaft adapted to contain and burn solid fuel, a flame chamber connected to and extending from said shaft, a second shaft connected to the other end of said flame chamber for receiving the waste gases therefrom a filling mass in said second shaft, said mass adapted to receive heat from the waste gases passing through the shaft and to radiate heat to the flame chamber, and means for maintaining a portion of the fuel alongside the flame chamber in the first shaft at white heat, the gases produced by the remainder of the fuel in said first shaft being adapted to flow through the white heat portion of the fuel to the flame chamber and then to said second shaft.

2. A furnace of the class described comprising a shaft adapted to contain and burn solid fuel, a flame chamber connected to and extending from said shaft, a second shaft connected to the other end of the flame chamber for receiving the waste gases therefrom, said second shaft containing a solid fuel adapted to radiate heat to the flame chamber, and an air conduit for supplying air to said first shaft, said conduit being located substantially midway of said first shaft and projecting toward said flame chamber.

3. A furnace of the class described comprising a shaft adapted to contain and burn solid fuel, a flame chamber connected to the middle section of said shaft and extending therefrom, a second shaft connected to the other end of the flame chamber for receiving the waste gases therefrom, said second shaft containing a solid fuel adapted to radiate heat to the flame chamber, and conduits adapted to supply air to different portions of said first-named shaft, one of said conduits being located substantially midway of said shaft and projecting toward the flame chamber.

4. A furnace of the class described comprising a shaft adapted to contain and burn solid fuel, a flame chamber connected to and extending from said shaft, a second shaft connected to the other end of the flame chamber for receiving the waste gases therefrom, said second shaft containing a solid fuel adapted to radiate heat to the flame chamber, a conduit for supplying air to said first shaft, a preheater, a channel connecting said second shaft with the preheater and means connecting said conduit with the preheater.

5. A furnace of the class described comprising a shaft adapted to contain and burn solid fuel, a flame chamber connected to and extending from said shaft, a second shaft adapted to contain solid fuel, connected to the other end of the flame chamber for receiving the waste gases therefrom, the waste gases contacting with the fuel in the second shaft, thus forming water gas in said second shaft, a conduit for supplying air to said first shaft, a conduit for supplying air to said second shaft above the fuel therein, to burn the water gas formed in the shaft, a preheater, a channel connecting said second shaft with the preheater, the preheater thereby receiving the heat of the waste gases and the heat of the burning water gas from the second shaft, and means for connecting the conduits with the preheater.

6. A furnace of the class described comprising a shaft adapted to contain and burn solid fuel, a flame chamber connected to said shaft and extending therefrom, a second shaft adapted to contain solid fuel connected to the other end of the flame chamber, a conduit connected to each shaft for supplying air thereto, and a pair of regenerators, one connected with each shaft, said shafts being adapted to alternately receive the waste gases from the flame chamber and deliver them to its associated regenerator.

7. A furnace of the class described comprising a shaft adapted to contain and burn solid fuel, a flame chamber connected to said shaft and extending therefrom, a second shaft adapted to contain solid fuel connected to the other end of the flame chamber, a conduit connected to each shaft for supplying air thereto, a pair of regenerators, a pair of channels for connecting the regenerators and shafts, each of said channels being adapted to alternately serve to supply preheated air from a regenerator to its associated shaft, and to deliver the waste gases from the shaft to the regenerator connected therewith.

8. A furnace of the class described comprising a shaft adapted to contain and burn solid fuel, a flame chamber connected to said shaft and extending therefrom, a second shaft adapted to contain solid fuel connected to the other end of the flame chamber, a conduit connected to each shaft substantially midway thereof, for supplying air to said shafts, said shafts being adapted to alternately receive the waste gases from the flame chamber, the waste gases contacting with the fuel in each shaft, thus forming water gas, another conduit adapted to supply air to each shaft to burn the water gas thus formed and a pair of channels connecting the regenerators and the shafts, said channels being adapted to alternately supply preheated air from each regenerator to its associated shaft and to deliver the waste gases from the shaft to its regenerator.

In testimony whereof, I have signed my name to this specification.

ROBERT WARSITZ.